Oct. 13, 1953 E. T. BURTON 2,655,625

SEMICONDUCTOR CIRCUIT ELEMENT

Filed April 26, 1952 3 Sheets-Sheet 1

FIG. $4B_2$

INVENTOR
E. T. BURTON
BY [signature]
ATTORNEY

Oct. 13, 1953 E. T. BURTON 2,655,625
SEMICONDUCTOR CIRCUIT ELEMENT
Filed April 26, 1952 3 Sheets-Sheet 2
FIG. 4A1
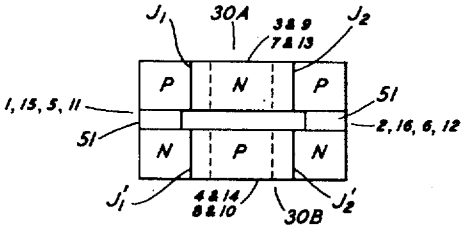
FIG. 4A3
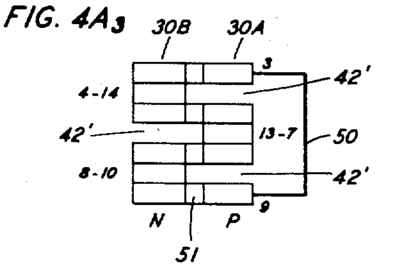
FIG. 4A2
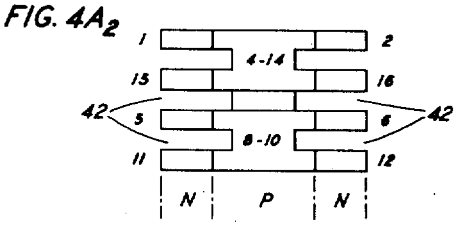
FIG. 4B1
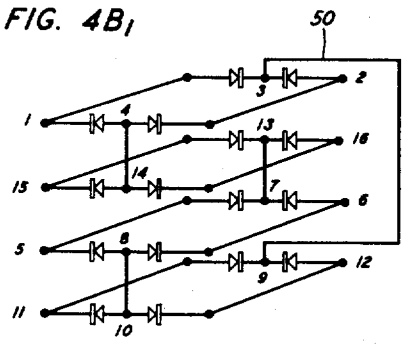
FIG. 2A
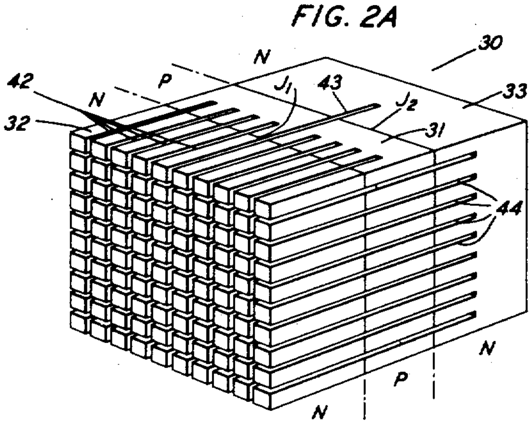
FIG. 2B
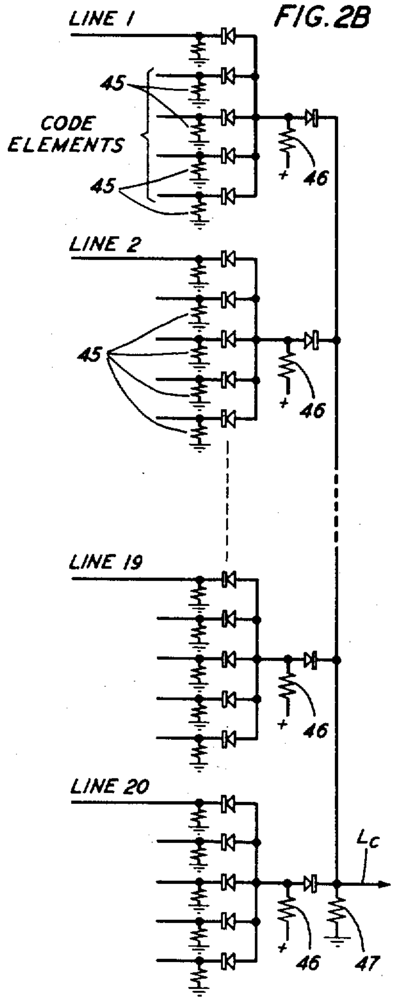
INVENTOR
E. T. BURTON
BY [signature]
ATTORNEY Oct. 13, 1953 E. T. BURTON 2,655,625
SEMICONDUCTOR CIRCUIT ELEMENT
Filed April 26, 1952 3 Sheets-Sheet 3
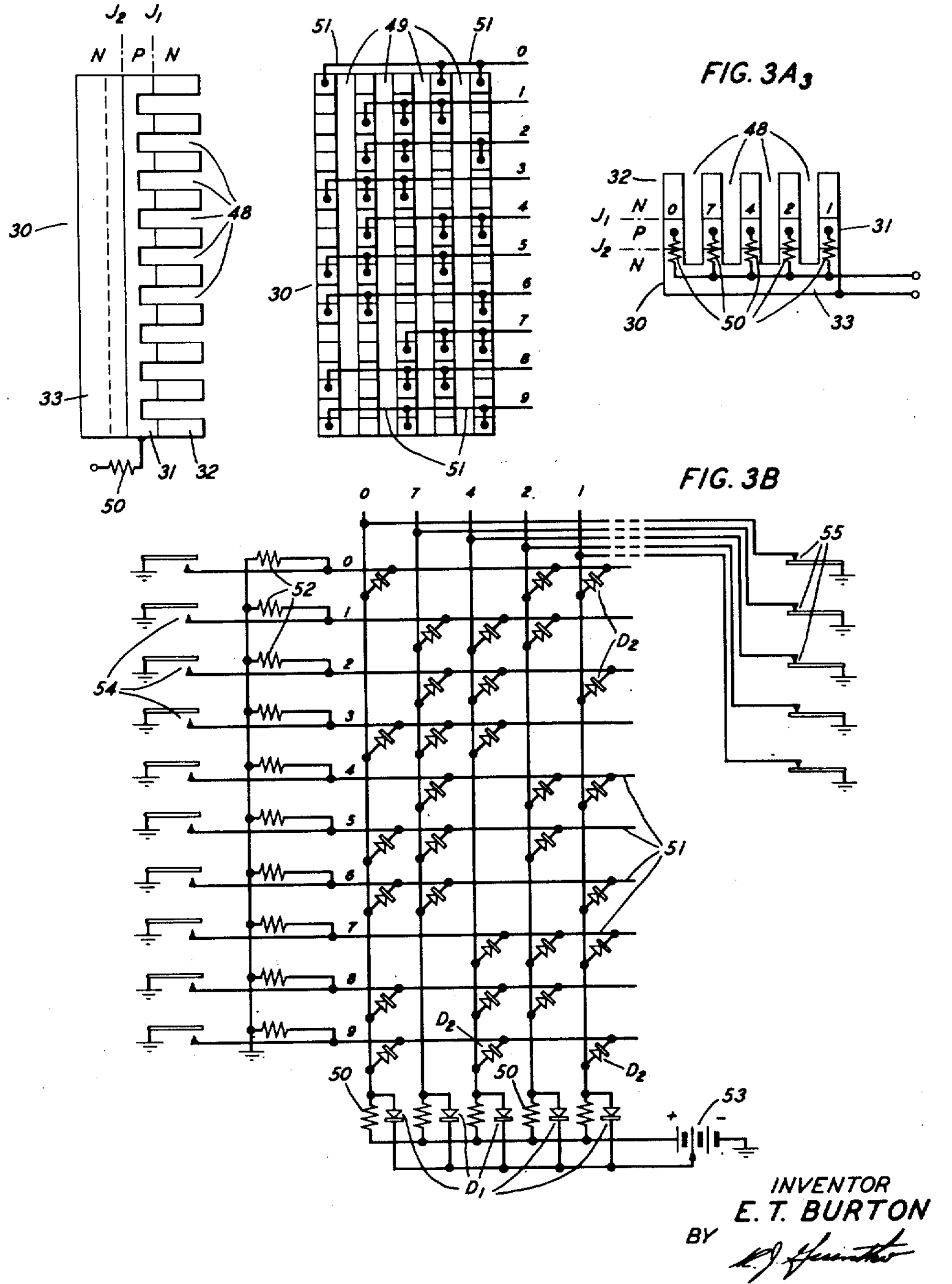
FIG. 3A1, FIG. 3A2, FIG. 3A3, FIG. 3B
INVENTOR
E. T. BURTON
BY [signature]
ATTORNEY Patented Oct. 13, 1953 2,655,625

UNITED STATES PATENT OFFICE 2,655,625

SEMICONDUCTOR CIRCUIT ELEMENT

Everett T. Burton, Millburn, N. J., assignor to Bell Telephone Laboratories, Incorporated, New York, N. Y., a corporation of New York Application April 26, 1952, Serial No. 284,567

10 Claims. (Cl. 317—235)

This invention relates to circuit elements and more particularly to such elements including semiconductor translating devices.

In a number of fields, for example in switching systems and electronic computers, circuit components frequently are used which comprise a multiplicity of rectifiers, such as semiconductor diodes, cooperatively associated in any one or more of a variety of ways. Proper or optimum functioning of such components often requires that at least certain of the diodes have essentially the same characteristics and fulfillment of this requirement may entail substantial selection and testing. Also the electrical association of these diodes involves considerable and often intricate wiring and such wiring may introduce complexities due to stray capacitances. Further, when a large number of rectifiers or similar devices are utilized, the components become undesirably volume consuming.

One general object of this invention is to improve the construction and performance of circuit elements including a plurality of translating devices.

More specific objects of this invention are to simplify the construction of circuit elements comprising a plurality of rectifiers, minimize the wiring requisite to associate the rectifiers in a prescribed relation, reduce stray capacitances in such elements, and enhance the economy of manufacture in quantity of circuit elements of like configuration.

In one illustrative embodiment of this invention, a circuit element comprises a body of semiconductive material, for example of germanium or silicon, having therein a zone of one conductivity type, that is N or P, sandwiched between two zones of the opposite conductivity type. Such bodies, which are commonly designated as of PNP or NPN configuration in accordance with the arrangement of the zones thereof, may be fabricated in several ways, a particularly advantageous way, producing single crystal bodies, being disclosed in the application Serial No. 168,184, filed June 15, 1950, of G. K. Teal. Each pair of adjacent zones constitutes a rectifying junction and, thus, a diode. A comprehensive analysis of the characteristics of such junctions is found in the Bell System Technical Journal, July 1949, page 435.

In accordance with one broad feature of this invention, a semiconductive body of NPN or PNP configuration is divided into a plurality of PN diodes electrically associated in accordance with a prescribed circuit pattern.

For example, in one illustrative embodiment of this invention, the semiconductive body of NPN configuration is provided with a multiplicity of slots certain of which extend through one of the N zones and across the adjacent NP junction and others of which extend through this N zone and the P zone and across both the junctions. The slots are so arranged as to divide the body into groups of diode elements, say five in each group, with the elements of each group in common back to back relation with a respective diode. The element thus constituted is particularly suitable for use in line scanning in telephone switching systems.

In NPN and PNP bodies produced in accordance with known techniques, the junctions possess high uniformity of characteristics across the interface between the defining zones. These characteristics for any junction can be determined by measurements at the surface of the body. Thus, it will be appreciated that devices constructed in accordance with this invention facilitate attainment of a circuit element comprising a plurality of semiconductor diodes of like characteristics. It will be appreciated also that as the diodes are interconnected through portions of the body itself, the wiring necessary to attain association of the diodes in accordance with a prescribed circuit pattern is minimized. Further, it is manifest that stray capacitances are greatly reduced. Finally, it is to be noted that by appropriate arrangement and extent of the slots, diode circuits of a variety of configurations are readily and economically realized.

The invention and the above noted and other features thereof will be understood more clearly and fully from the following detailed description with reference to the accompanying drawing wherein each figure except Fig. 1 is composed of two parts, part A illustrating a semiconductive circuit element constructed in accordance with this invention and part B depicting the circuit analog of this element. In the drawing:

Fig. 2 illustrates a diode circuit element constructed in accordance with this invention, comprising a plurality of groups of diodes defining code elements each associated with a respective single diode, the element being particularly suitable for use in line scanning in telephone switching systems for example;

Fig. 3 shows a code translator illustrative of another embodiment of this invention; and Fig. 4 depicts another embodiment of this invention wherein the diodes are associated to define a two-stage switch.

Figure 1:
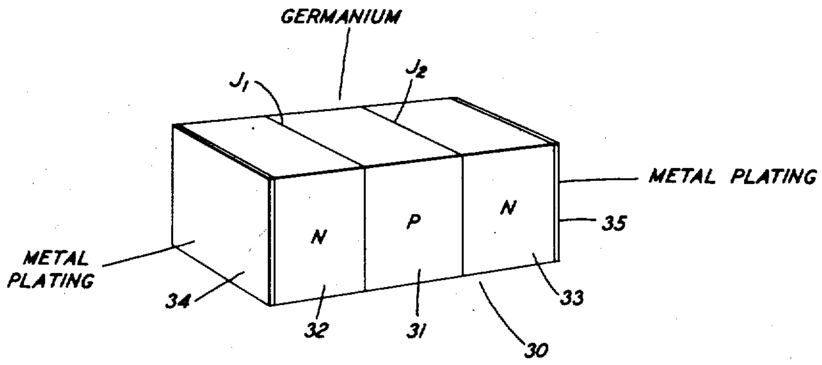
Fig. 1 is a perspective view of a semiconductive body illustrative of those which may be utilized in the fabrication of circuit elements constructed in accordance with this invention.
Figure 1:
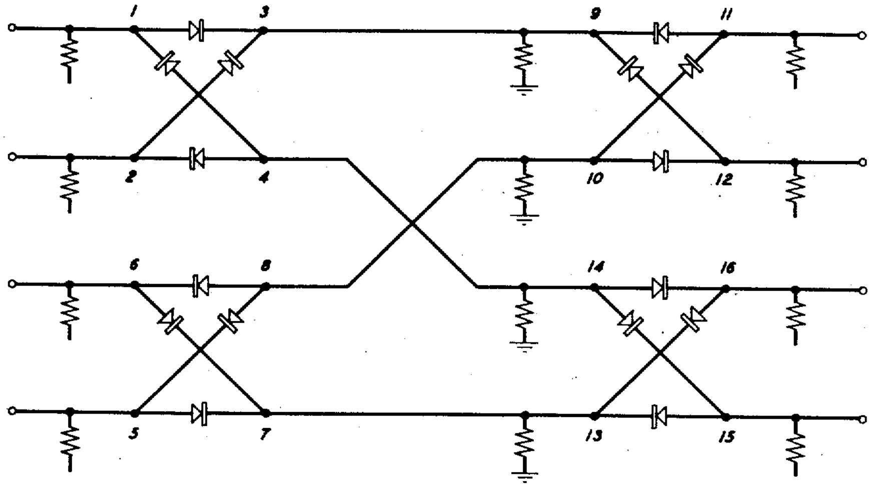

In the drawing, zones of the semiconductive bodies shown are designated by the letter, N or P, indicative of the conductivity type thereof. For the sake of clarity and simplicity of illustration, in part A of each of Figs. 2 to 5, in which the semiconductive body comprises a multiplicity of N and P portions, the division of the body into zones of which these portions are constituted, is indicated by section lines and a single letter, N or P, has been employed to indicate the conductivity type of all portions between or to one side of the section lines.

Referring now to the drawing, Fig. 1 illustrates a semiconductive body 30, for example of germanium or silicon and advantageously of single crystal structure, which may be utilized in the fabrication of circuit elements in accordance with this invention. The body comprises a P conductivity type zone 31 between a pair of N zones 32 and 33, advantageously of the same conductivity, and forming junctions $J_1$ and $J_2$ therewith. The outer end faces of the zones 32 and 33 have thereon metal, e. g. copper or rhodium, platings 34 and 35 providing ohmic connections to the N zones 32 and 33 respectively. As will appear hereinafter, similar platings may be applied on one or more faces of the P zone 31 to provide ohmic connections thereto.

Each N zone defines a rectifier unit or element with the P zone 31, the rectifying barrier obtaining at the junction $J_1$ or $J_2$. As has been noted hereinabove, the characteristics of the junctions are substantially uniform over their areas. Thus, elemental areas of each junction will provide substantially the same rectification performance.

The circuit element of Fig. 2 comprises the semiconductive body 30 of NPN composition as shown, which is provided with a multiplicity of parallel slots 42 all extending through the same N zone 32 and across the junction $J_1$. The body is provided also with a slot 43 which extends through the N zone noted and across both junctions $J_1$ and $J_2$, and with a plurality of transverse parallel slots 44 each of which also extends through the noted N zone and across both the junctions. Thus, for the particular number of slots shown in Fig. 2A, the body 30 is divided into twenty groups of five diodes, each diode being constituted by portions of the zones 32 and 33, and each group being in back to back relation with a common diode defined by the zone 33 and a portion of the zone 31.

The slots may be produced by saw cutting a semiconductive body of the construction shown in Fig. 1. Advantageously, in order to prevent degradation of the junction characteristics as a result of the sawing, the body is etched and rinsed after the cutting of the slots. Electrical connection to the diodes may be made by affixing, e. g. soldering, conductors to the platings or coatings 34 and 35 (not shown in Fig. 2).

The electrical association of the component diodes and one manner of utilization of the circuit element of Fig. 2A is represented in Fig. 2B. As shown in the latter figure, each group of five diodes constitutes a line diode and four associated diode code elements, the P sides of the five being directly interconnected or common and directly connected also the P side of the common series diode. The N sides of the several series diodes are interconnected directly and lead to a common line $L_c$. Appropriate resistors 45 are provided individually for the N terminals of the line and code diodes, similar individual resistors 46 are associated with the P sides of the series diodes and a further resistance 47 is associated with the common line $L_c$ as shown.

Normally biases of the polarities indicated are applied to the code and series diodes, so that the code elements are conducting and the several line diodes are in effect open circuited. If, however, the N sides of the code elements are driven positive, these elements are effectively blocked and a low impedance path is completed from the line, say line 1, to the common line $L_c$. Such action may be effected by application of pulse groups, for example in accordance with a binary code, to the N sides of each group of code elements, it being understood, of course, that a different code will be necessary to cause the described action of each group of elements. For example, a group of pulses may be applied to the code elements associated with line 1, one pulse to each element, in accordance with the binary number 0101, another group corresponding to the binary number 1001 applied to the code elements associated with line 2, and so on.

In a typical circuit element of the construction portrayed in Fig. 2A and providing twenty groups of four code elements each, and twenty associated lines, the slots may be 0.02 wide and adjacent ones spaced 0.03 inch. Thus, the requisite 100 diodes defining the groups can be obtained in a body 30 about one-half inch square in section. The body may be approximately one-half inch in length. From these typical figures, the compactness and small volume of the circuit element will be manifest. Also manifest are the relative simplicity of structure and facility of fabrication of the circuit element and the minimization of the wiring requisite to provide the large number of bodies electrically associated in the prescribed pattern.

The invention may be embodied also in circuit elements particularly suitable for use in code translators. One embodiment for translation between decimal and two out of five systems is illustrated in Fig. 3. Figs. $3A_1$, $3A_2$ and $3A_3$ are side elevation, front and end views respectively of a semiconductive, NPN, body 30. This body, as shown in Fig. 3A, is provided with nine transverse slots 48 each of which extends through the N zone 32 and across the junction $J_1$. It is provided further, as shown in Figs. $3A_2$ and $3A_3$, with four longitudinal slots 49 each of which extends through the N zone 32, the P zone 31 and across both the junctions $J_1$ and $J_2$. Thus, the body is divided into a multiplicity of NP diodes, each defined by a portion of zone 32 and a portion of zone 31, arranged in five columns of ten each, the diodes in each column being in back to back relation with a common series diode constituted by the N zone 33 and a part of the P zone 31. Each P zone section 31 is connected through a resistor 50 to a selected source of potential, the function of which resistors will appear presently.

Three of the diodes in each row are interconnected by a tie wire 51 in accordance with a code pattern described hereinafter. The electrical association of the rectifier units constituted by the slotted semiconductive body with group of three interconnected in this manner is represented in Fig. 3B, wherein the series diodes aforementioned are designated by $D_1$ and the other diodes by $D_2$. The columns of diodes correspond to the code numbers 0, 1, 2, 4 and 7 as indicated and the rows correspond to the digits 0 to 9, also as indicated. In utilization of the translator, advantageously the tie conductors 51 are grounded through bleeder resistors 52 of much greater value than the resistors 50. The columns of diodes $D_2$ are biased in the forward direction from a suitable source 53 and the series diodes $D_1$ are biased at a lower potential and in the forward direction, as by the source as indicated.

As indicated hereinabove, the circuit element portrayed in Fig. 3 is utilizable as a translator between decimal and two out of five codes. Translation may be in either direction. The operation in translation from decimal to two out of five will be understood from the following considerations. For this case, the input is applied to the rows and the output read at the columns. The translation is in accordance with the following relations:

| Decimal | 2 out of 5 |
|---|---|
| 1 | 1+0 |
| 2 | 2+0 |
| 3 | 2+1 |
| 4 | 4+0 |
| 5 | 4+1 |
| 6 | 4+2 |
| 7 | 7+0 |
| 8 | 7+1 |
| 9 | 7+2 |
| 0 | 7+4 |

In general, in the translation a useful output signal is recognized in the output leads by a change of potential on all but the lead on which the output signal is to be realized. Thus, the input activity in inhibitive. The output reading intervals are taken between the transition intervals in which the codes are established. A specific example will illustrate the principles involved. Consider the translation of the decimal 5 to the two out of five system (4+1). In this case the relay contacts 55 are inoperative and remain disconnected. The decimal 5 lead is carried negative as by closing it to ground over a switch or relay contact 54. Thus, the output leads 0, 7 and 2 are grounded over the diodes $D_2$ connected between these leads and the decimal lead 5. However, no change occurs in the condition of output leads 1 and 4. Sampling of the output leads, then, indicates leads 1 and 4 as positive whereby the translation from decimal 5 to two out of five, (4+1) is effected.

The series diodes $D_1$, it will be noted, normally are biased in the forward direction from the source 53. They serve primarily to speed the return from the grounded condition to the normal, positive, condition upon removal of the ground from the input, decimal, leads. Specifically, because of the action of these diodes, the upper side (in Fig. 6B) of each of the current limiting resistors 50 is returned to substantially its normal potential in materially less time than if these diodes were absent.

Translation from the two out of five system to the decimal is effected in a similar manner. The relay contacts 54 remain unused and open in this case. The "no signal" condition obtains with all input (column) leads grounded, as over the switch or relay contacts 55. To effect translation, the appropriate ground connections are opened. For example, if the contacts 55 associated with input (column) leads 1 and 4 are opened, thereby to remove ground, these leads will go pisitive whereby all of the output decimal leads except 5 also go positive. Sampling of the output leads will then disclose all except 5 positive, 5 remaining at ground potential.

In the embodiment of this invention depicted in Fig. 4, the semiconductive body, of which Figs. $4A_1$, $4A_2$ and $4A_3$ are top, side elevation, and end views respectively, comprises two parts 30A and 30B, one of PNP and the other of NPN composition as shown. The two parts are joined, as by solder indicated at 51 so that each of the P zones of part 30A is tied electrically to a respective one of the N zones of part 30B, and the N zone of part 30A is spaced from the P zone of part 30B. The body 30A, 30B is provided with a plurality of slots 42 which extend inwardly from opposite ends of the body and each of which extends through a corresponding pair of N and P zones on the two parts and across the associated set of junctions $J_1$ and $J_1'$ on the one end, and $J_2$ and $J_2'$ on the other. The body is provided also with other slots 42' which extend inwardly from opposite sides of the body and each of which passes through a respective one of the parts 30A or 30B.

The semiconductive body thus is divided into sixteen PN diodes certain of which remain connected by parts of the bodies, others of which are connected by the solder 51, and two of which are tied together by an external conductor 50 as shown in Fig. $4A_3$. In Figs. $4A_1$, $4A_2$ and $4A_3$, one terminal of each of the diodes is indicated by a respective numeral 1 to 16 inclusive. The electrical association of the several diodes is illustrated in Figs. $4B_1$ and $4B_2$ in which the terminals noted are designated by the same numerals as in Figs. $4A_1$, $4A_2$ and $4A_3$.

It will be seen from Fig. $4B_2$ that the circuit element of Fig. 4A constitutes a two-stage switch. The operation will be understood from consideration of typical cases. For example, if terminals 1 and 11 are made positive a path is closed over terminals 1, 3, 9 and 11. If both terminals 1 and 16 are made negative, a path is closed over terminals 1, 4, 14 and 16. A path may be closed from terminal 1 to terminal 15 over 4 and 14 by making 1 and 15 negative, or from terminal 1 to 12 by making 1 and 12 positive. In similar manner, paths may be completed or closed from each of terminals 2, 5 and 6 to any one of the terminals 11, 12, 15 or 16.

What is claimed is:

1. A circuit element comprising a body of semiconductive material including a zone of one conductivity type between and forming junctions with a pair of zones of the opposite conductivity type, and means dividing said body into a plurality of diodes associated in accordance with a preassigned circuit pattern, said means comprising a plurality of slots each of which extends through one of said pair of zones and across at least one of said junctions.

2. A circuit element comprising a body of semiconductive material having therein a zone of one conductivity type between and defining junctions with a pair of zones of the opposite conductivity type, and means dividing said body into a plurality of diodes electrically interconnected in accordance with a prescribed circuit pattern, said means comprising a plurality of slots in said body each of which extends through one of said pair of zones and across one of said junctions and certain of which extend across both of said junctions and through one of said pair of zones.

3. A circuit element comprising a body of semiconductive material including a zone of one conductivity type between and forming junctions with a pair of zones of the opposite conductivity type, said body having therein a plurality of slots dividing it into a plurality of diodes disposed in prescribed relation, each of said slots extending through one of said pair of zones, and means electrically associating said diodes into a network of preassigned configuration comprising conductors connecting certain terminals of said diodes.

4. A signal translating device comprising a body of semiconductive material including a zone of one conductivity type between and defining a pair of junctions with a pair of zones of the opposite conductivity type, said body having therein a slot extending through one of said pair of zones and said first zone, said body having therein also a plurality of slots on opposite sides of said first slot and each extending through said one zone and across the junction associated therewith.

5. A circuit element comprising a body of semiconductive material including a zone of one conductivity type between and defining a pair of junctions with a pair of zones of the opposite conductivity type, said body having therein a plurality of slots certain of which extend through one of said pair of zones and across only one of said junctions and others of which extend through said one zone and across both of said junctions, said slots dividing said one zone into a plurality of sections, individual electrical connections to said sections, and an electrical connection to the other of said pair of zones.

6. A signal translating device comprising a body of semiconductive material including a zone of one conductivity type between and defining a pair of junctions with a pair of zones of the opposite conductivity type, said body having therein a slot extending through one of said pair of zones and said first zone, said body having therein also a plurality of slots on opposite sides of said first slot, parallel thereto and each extending through said one zone and across the junction defined thereby and said first zone, and said body having therein a plurality of slots intersecting said one and said first plurality of slots each extending through said one zone and across both said junctions.

7. A circuit element comprising a semiconductive body including a first zone of one conductivity type between and defining a pair of junctions with a pair of zones of the opposite conductivity type, said body having therein a plurality of substantially parallel slots each extending through one of said pair of zones and across the junction associated therewith, said body having therein also a second plurality of slots intersecting said first slots and each extending through said one zone and said first zone and across both said junctions.

8. A circuit element comprising a semiconductive body including a first zone of one conductivity type between and defining a pair of junctions with a pair of zones of the opposite conductivity type, said body having therein a plurality of slots dividing said body into a plurality of diodes arranged in columns and rows, each of said diodes being defined by a section of said first zone and of one of said pair of zones, said slots dividing said body also into a group of other diodes each defined by a section of said first zones and the other of said pair of zones, and one for each column of said first diodes and in common back to back relation therewith.

9. A circuit element comprising a pair of bodies of semiconductive material, one of NPN and the other of PNP configuration, said bodies being laterally adjacent with each N zone opposite a P zone of the other body, and means electrically connecting the opposite outer zones of the two bodies, said bodies having therein pairs of slots extending from opposite ends and each extending entirely through a respective one of the outer zones, the two bodies having equal numbers of said slots, and said bodies having therein a plurailty of other slots each extending through the respective body and between a respective pair of the first slots therein.

10. A circuit element comprising a pair of bodies of semiconductive material, one of NPN and the other of PNP configuration, said bodies being laterally adjacent with each N zone opposite a P zone of the other body, and means electrically connecting the opposite outer zones of the two bodies, one of said bodies having therein a pair of transverse slots dividing it into sections and the other of said bodies having therein a transverse slot disposed intermediate said pair of slots, and both said bodies having therein a like number of pairs of opposed slots, each slot of a pair extending entirely through a respective one of the other zones of the respective body.

EVERETT T. BURTON.

References Cited in the file of this patent

UNITED STATES PATENTS

| Number | Name | Date |
|---|---|---|
| 2,402,661 | Ohl | June 25, 1946 |
| 2,595,497 | Webster | May 6, 1952 |
| 2,623,102 | Shockley | Dec. 23, 1952 |